United States Patent [19]

Takatori et al.

[11] Patent Number: 5,715,085
[45] Date of Patent: Feb. 3, 1998

[54] OPTICAL FILTER

[75] Inventors: Naoki Takatori; Masaaki Orimoto, both of Tokyo, Japan

[73] Assignee: Fuji Photo Film Co., Ltd., Kanagawa, Japan

[21] Appl. No.: 892,677

[22] Filed: Jun. 4, 1992

Related U.S. Application Data

[63] Continuation of Ser. No. 546,187, Jun. 29, 1990, abandoned.

[30] Foreign Application Priority Data

| Jul. 10, 1989 | [JP] | Japan | 1-177317 |
| Oct. 4, 1989 | [JP] | Japan | 1-259401 |
| May 28, 1990 | [JP] | Japan | 2-137635 |

[51] Int. Cl.$^6$ .................................. G02B 5/30
[52] U.S. Cl. .................. 359/495; 359/497; 359/498; 359/502
[58] Field of Search ................... 350/401, 403, 350/404; 358/44, 55; 359/485, 494, 495, 497, 498, 499, 502

[56] References Cited

U.S. PATENT DOCUMENTS

| 3,588,224 | 6/1971 | Pritchard | 350/404 |
| 3,784,734 | 1/1974 | Watanabe et al. | 350/404 |
| 4,575,193 | 3/1986 | Greivenkamp, Jr. | 350/401 |
| 4,580,878 | 4/1986 | Tsuji | 359/498 |
| 4,587,553 | 5/1986 | Watanabe et al. | 358/64 |
| 4,624,563 | 11/1986 | Johnson | 356/367 |
| 4,626,897 | 12/1986 | Sato et al. | 350/404 |
| 4,743,100 | 5/1988 | Nakada et al. | 358/55 |
| 4,807,981 | 2/1989 | Takizawa et al. | 350/408 |
| 4,878,737 | 11/1989 | Ise | 350/167 |

FOREIGN PATENT DOCUMENTS

| 51-127746 | 11/1976 | Japan . | |
| 0066449 | 6/1977 | Japan | 359/498 |
| 0039683 | 3/1982 | Japan | 358/44 |
| 57-15369 | 3/1982 | Japan | 359/498 |
| 57-39683 | 3/1982 | Japan | 359/498 |
| 61-83517 | 4/1986 | Japan | 350/401 |
| 0151829 | 6/1990 | Japan | 359/485 |

Primary Examiner—Ricky D. Shafer
Attorney, Agent, or Firm—Sughrue, Mion, Zinn, Macpeak & Seas, PLLC

[57] ABSTRACT

An optical filter comprising a birefringent material which is interposed between a taking lens and an image pickup device for removing a component corresponding to a frequency multiplexing in a spacial frequency manner from a high frequency component contained in an image of an object. In the optical filter, the angle formed between its optical axis and an incident plane is smaller than an angle of 45°, preferably, approximately 35°.

6 Claims, 5 Drawing Sheets

OPTICAL FILTER

This is a Continuation of application Ser. No. 07/546,187 filed Jun. 29, 1990, abandoned.

BACKGROUND OF THE INVENTION

1. Field of the Invention

The present invention relates to an optical filter and, in particular, to an optical filter which is interposed between a taking lens and an image pickup device and is composed of a birefringent material to remove a component of an image of an object corresponding to frequencies, which are multiplexed in a spacial frequency manner, from a high spacial frequency component contained in the object image.

2. Description of the Related Art

In general, in a CCD image pickup device and the like, an image of an incident light is sampled by sensors which are arranged at given intervals from one another in vertical and horizontal directions, respectively and, for this reason, the highest spacial frequency that can be resolved is a half of the sampled spacial frequency that can be determined according to the arrangement of the sensors, that is, a Nyquist rate. If a spacial frequency equal to or more than the Nyquist rate is contained in the incident light image, then the incident light image is turned back within its pass band, thereby producing a false signal or a moire effect.

Therefore, in the CCD image pickup device, such high frequency is removed by an optical low pass filter (OLPF) before sampling.

The OLPF is employed because it is capable of separating an ordinary ray from extraordinary ray for a birefringent material such as crystal, calcite and the like. And, the OLPF is designed such that the width of such separation is a half of a cutoff frequency.

Conventionally, this type of OLPF is arranged such that an angle of inclination of an optical axis is 45° because the separation width of ray is the maximum when the angle of inclination of the optical axis is 45° with respect to an incident plane.

The above-mentioned conventional OLPF is able to minimize the thickness of OLPF to obtain a desired separation width of ray due to the fact that it is designed that the angle of inclination of the optical axis thereof is 45°. However, when an angle of incidence of an incident light ray into the incident plane thereof is large (for example, in a corner of a photographing screen when an exit pupil position is adjacent to an image forming plane), the separation width of ray varies greatly, which fails to provide the characteristic of the OLPF, resulting in the generation of a false signal.

SUMMARY OF THE INVENTION

The present invention aims at eliminating the drawbacks found in the above-mentioned prior art.

Accordingly, it is an object of the invention to provide an optical filter which provides a good characteristic even when an angle of incidence of an incident light is great and also which is capable of preventing generation of a false signal.

In order to attain the above object, according to the invention, there is provided an optical filter comprising a birefringent material which is interposed between a taking lens and an image pickup device to remove a component of an image of an object corresponding to frequencies, which are multiplexed in a spacial frequency manner, from a high spacial frequency component contained in the object image, characterized in that an angle of an optical axis of the optical filter with respect to an incident plane is set smaller than an angle of 45°.

According to the invention, due to the fact that an angle of inclination of the optical axis of the optical filter with respect to the incident plane is set about 35°, even when the angle of incidence of an incident light is great, variations of the separation width between an ordinary ray and an extraordinary ray are not great, that is, the characteristic of the optical filter does not vary according to the angles of incidence of the incident light.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 5 (B) is a view to show the MTF characteristic of the optical filter in FIG. 4 with respect to the spacial frequencies thereof; and, FIGS. 6 to 8 are respectively views used to explain the principles of an optical filter according to the invention.

DETAILED DESCRIPTION OF THE INVENTION

Detailed description will hereunder be given of the preferred embodiments of an optical filter according to the present invention with reference to the accompanying drawings.

At first, the principles of an optical filter according to the invention will be described.

When a crystal optical low pass filter (OLPF) is employed in an optical system, the characteristic of the optical filter varies according to the angles of incidence thereof. Let us consider here how it varies.

θ; incident angle of ray, $\theta_0$; refractional angle of ordinary ray,

β; angle between optical axis and normal of incident plane $\theta_e'$; refractional angle of extraordinary ray $n_0$; ordinary index of refraction B; separation width of ray, $n_e$; extraordinary index of refraction t; thickness of crystal.

(ordinary ray)

A ordinary ray has an index of refraction which provides a sphere and, in the ordinary ray, the direction of the light ray vector thereof coincides with the wave vector thereof. Therefore, if the air that exists around a crystal parallel plane plate is a homogeneous air, then the optical of the light ray can be obtained by the following equation:

$$\left.\begin{array}{rl}\sin\theta &= n_0 \sin\theta_0' \\ B_0 &= \tan\theta_0' \times t \\ &= \dfrac{\sin\theta}{\sqrt{n_0^2 - \sin^2\theta}} \times t\end{array}\right\} \quad (1)$$

(extraordinary ray)

In order to find the advancing direction of an extraordinary ray, at first the direction of the wave vector thereof is to be found. The Snell's law holds for the wave vector with respect to the ordinary ray, and thus an equation $$N = n_0 \sin\theta_0' = n_e' \sin\theta_e = \sin\theta \quad (2)$$

can be obtained. Here, $n_e'$ can be found from an index of refraction which provides an ellipsoid.

Figure 7:
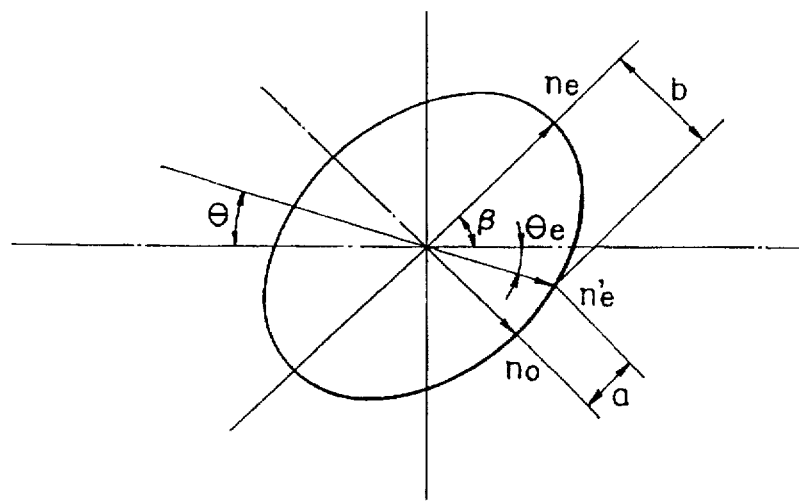

If symbols are defined as shown in FIG. 7, then simultaneous equations $$\left.\begin{array}{l}\dfrac{a^2}{n_e^2} + \dfrac{b^2}{n_0^2} = 1 \\ b = \dfrac{-a}{\tan(\theta_e + \beta)} \\ n_e' = \sqrt{a^2 + b^2}\end{array}\right\} \quad (3)$$

hold, and if a, b are eliminated from the simultaneous equations (3), then an equation $$n_e' = \sqrt{\dfrac{n_e^2 n_0^2}{n_0^2 \sin^2(\theta_e + \beta) + n_e^2 \cos^2(\theta_e + \beta)}} \quad (4)$$

can be obtained. Thus, from the second equation (2) relating to the wave vector, an equation $$\begin{aligned}\sin\theta &= n_e' \sin\theta_e \\ 0 &= n_e' - \dfrac{\sin\theta}{\sin\theta_e} \\ &= \sqrt{\dfrac{n_e^2 n_0^2}{n_0^2 \sin^2(\theta_e + \beta) + n_0^2 \cos^2(\theta_e + \beta)}} - \dfrac{\sin\theta}{\sin\theta_e}\end{aligned} \quad (5)$$

can be obtained. If $\theta_e + \beta$ is found with respect to $\theta$ from the fifth equation (5), then another equation $$\theta_e + \beta = \tan^{-1}\left\{ \dfrac{n_e}{n_0} \cdot \dfrac{1}{\sin^2\theta - n_e^2 \cos^2\beta} \times \right. \quad (6)$$

$$\left. (-n_e n_0 \cos\beta \sin\beta \pm \sin\theta \sqrt{n_0^2 \sin\beta + n_e^2 \cos^2\beta - \sin^2\theta}\,) \right\}$$

(6) can be obtained, whereby the direction of the wave vector can be determined.

Next, a light ray vector is to be found. The light ray vector is present in a plane which contains the wave vector and the optical axis, and in the direction of the point of contact between the normal of the wave vector and an optical speed surface.

Figure 8:
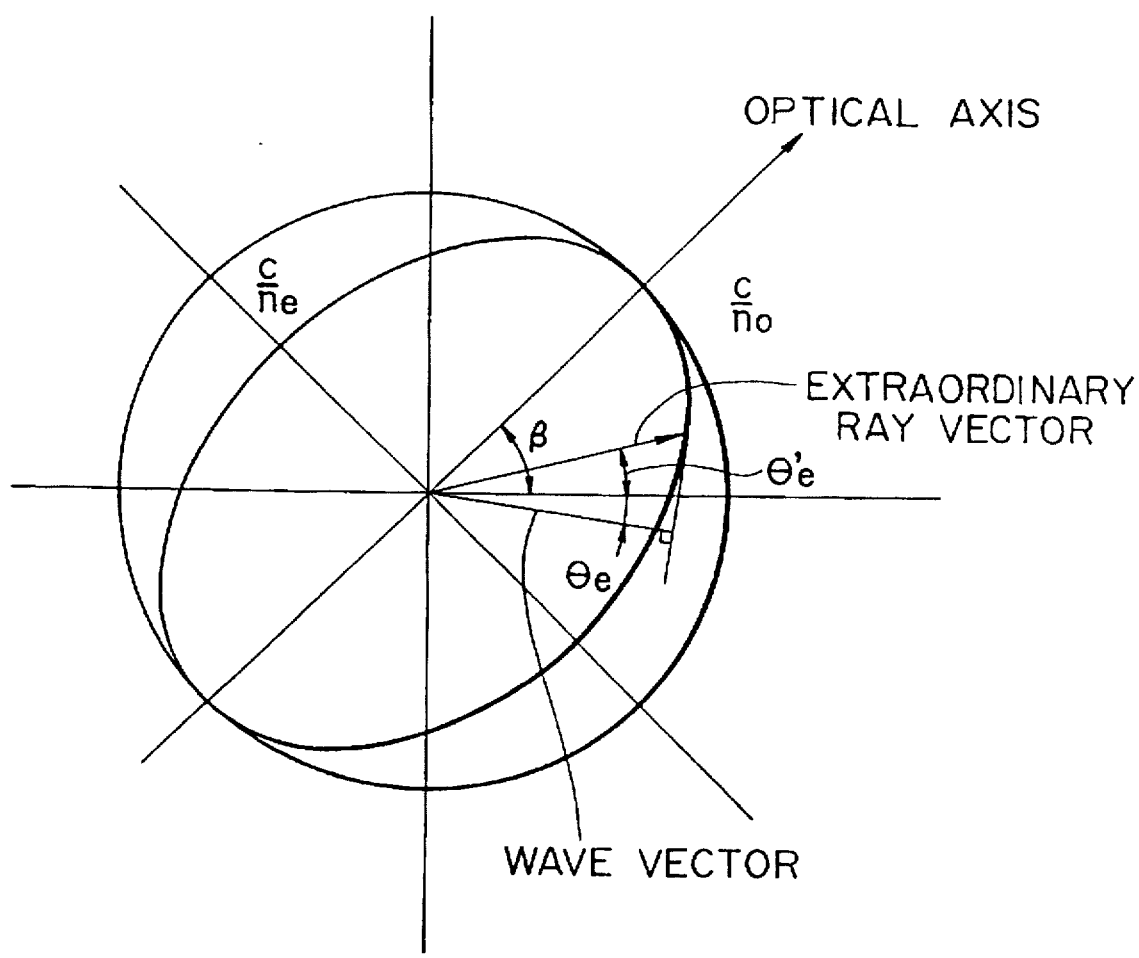

If the coordinates of the optical axis are considered from FIG. 8, then an equation (7) is obtained.

$$\dfrac{x^2}{\left(\dfrac{C}{n_0}\right)^2} + \dfrac{y^2}{\left(\dfrac{C}{n_e}\right)^2} = 1 \quad (7)$$

Then, if both sides of the seventh equation (7) are differentiated with respect to x, then there is obtained another equation $$\dfrac{dy}{dx} = -\dfrac{\left(\dfrac{C}{n_e}\right)^2}{\left(\dfrac{C}{n_0}\right)^2} \cdot \dfrac{x}{y} \quad (8)$$

Here, if it is assumed that the intersecting point coordinates of the light ray vector with an ellipse in the coordinates of the optical axis are (P, Q), then the inclination of the tangent thereof can be obtained by the following equation $$\dfrac{\left(\dfrac{C}{n_e}\right)^2}{\left(\dfrac{C}{n_0}\right)^2} \cdot \dfrac{P}{Q} = -\dfrac{n_0^2}{n_e^2} \cdot \dfrac{1}{\tan(\theta_e' + \beta)} \quad (9)$$

Because the wave vector intersects the above-mentioned tangent, there is obtained the following equation $$\tan(\theta_e + \beta)\left\{ -\dfrac{n_0^2}{n_e^2} \cdot \dfrac{1}{\tan(\theta e' + \beta)} \right\} = -1 \quad (10)$$

$$\tan(\theta_e' + \beta) = \dfrac{n_0^2}{n_e^2} \tan(\theta_e + \beta)$$

Here, if the value of the wave vector of the sixth equation (6), that is, $(\theta_0 + \beta)$ is substituted, then there is obtained the following equation $$\tan(\theta_e' + \beta) = \dfrac{n_0^2}{n_e^2} \left\{ \dfrac{n_e}{n_0} \cdot \dfrac{1}{\sin^2\theta - n_e^2 \cos^2\beta} \times \right.$$

$$\left. (-n_e n_0 \cos\beta \sin\beta \pm \sin\theta \sqrt{n_0^2 \sin\beta + n_e^2 \cos^2\beta - \sin^2\theta}\,) \right\}$$

and, therefore, a further equation $$\tan\theta_e' = \dfrac{1}{n_e^2 \cos^2\beta + n_0^2 \sin^2\beta} \times \quad (11)$$

$$\left\{ (n_0^2 - n_e^2) \sin\beta \cdot \cos\beta + \dfrac{n_0 n_e \sin\theta}{\sqrt{n_e^2 \cos^2\beta + n_0^2 \sin^2\beta - \sin^2\theta}} \right\}$$

is obtained.

Figure 6:
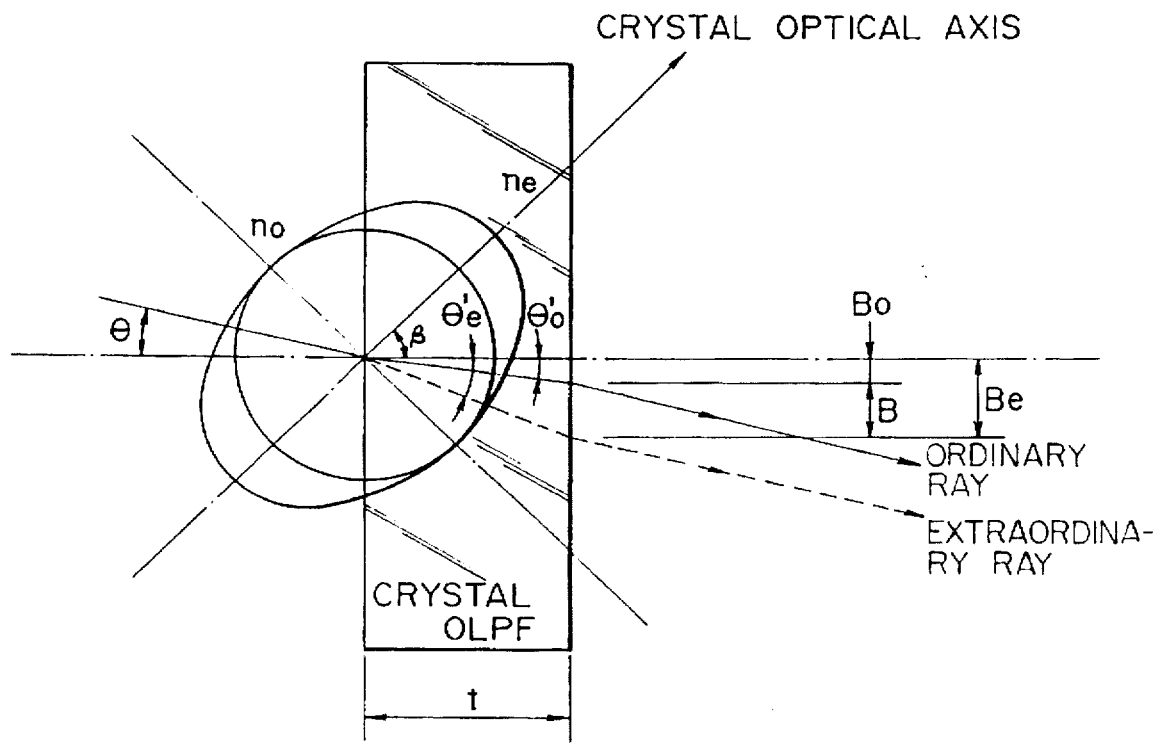

On the other hand, as shown in FIG. 6, $$B\,e = \tan\theta_e' \times t \quad (12)$$

and the separation width B can be expressed by an equation $$B = B_e - B_0 \quad (13)$$

Therefore, if the first equation (1), eleventh equation (11) and twelfth equation (12) are substituted in the thirteenth equation (13), then the following equation $$B = \tan\theta_e' \times t - \tan\theta_o' \times t = \left( \frac{1}{n_e^2\cos^2\beta + n_o^2\sin^2\beta} \times \right. \quad (14)$$

$$\left\{ (n_o^2 - n_e^2)\sin\beta \cdot \cos\beta + \frac{n_o n_e \sin\theta}{\sqrt{n_e^2\cos^2\beta + n_o^2\sin^2\beta - \sin^2\theta}} \right\} -$$

$$\left. \frac{\sin\theta}{\sqrt{n_o^2 - \sin^2\theta}} \right) \times t$$

can be obtained, where the crystal plate thickness t is a thickness per unit.

Now, in order to find an optical axis angle in which the separation width B is substantially independent of the angle of incidence θ, we may find such optical axis angle in which $dB/d\ \theta=0$ for incident angle $\theta=0°$.

Accordingly, if the above-mentioned equation (14) is differentiated with respect to θ and θ=0 is substituted, then there is obtained a further equation $$0 = \frac{n_o n_e}{(n_e^2\cos^2\beta + n_o^2\sin^2\beta)} \times \frac{1}{\sqrt{n_e^2\cos^2\beta + n_o^2\sin^2\beta}} - \frac{1}{n_o}$$

$$\frac{1}{(n_e^2\cos^2\beta + n_o^2\sin^2\beta)^{3/2}} = \frac{1}{n_o^2 n_e}$$

$$n_e^2(1 - \sin^2\beta) + n_o^2\sin^2\beta = (n_o^2 n_e)^{2/3}$$

$$(n_o^2 - n_e^2)\sin^2\beta = (n_o^2 n_e)^{2/3} - n_e^2$$

$$\sin^2\beta = \frac{(n_o^2 n_e)^{2/3} - n_e^2}{n_o^2 - n_e^2}$$

$$\therefore \beta = \sin^{-1}\sqrt{\frac{(n_o^2 n_e)^{2/3} - n_e^2}{n_o^2 - n_e^2}} \quad (15)$$

Because β can be determined by $n_o$, $n_e$, it can be understood that β is dependent on wave lengths. If $n_o$, $n_e$ are actually substituted in the fifteenth equation (15) for calculation, there is obtained the following table, that is, Table 1.

TABLE 1

| OPTICAL AXIS HARDLY DEPENDENT ON INCIDENT ANGLE | | |
|---|---|---|
| ch | entry nm | ANGLE BETWEEN PRINCIPAL PLANE AND OPTICAL AXIS (90°-β) |
| d line | 587.6 | 35.185° |
| e line | 546.1 | 35.184° |
| R-ch | 650 | 35.185° |
| B-ch | 450 | 35.183° |

As shown in Table 1, when 35.2°, there are obtained optical axis angles which are hardly dependent on incident angles and thus are substantially free from the wavelengths.

Therefore, to design a crystal OLPF which is independent of incident angles, the optical axis angles 35.2° may be taken as a reference value and, by taking into consideration the exit pupil angles of the optical system, the amount of variations of the cutoff frequencies, and the variations of the cutoff frequencies according to the heights of images, the optical axis angle may be shifted gradually from the reference value so as to find the optimum value.

In Table 2, there is shown a tolerance for angles between the principal plane of a crystal OLPF and the optical axis thereof with respect to the exit pupil positions or incident angles that are necessary to keep the cut-off frequencies in the screen within a range of ±5% from the center cut-off frequency. In this table, the exit pupil positions illustrated are obtained when a ½ inch CCD is used.

TABLE 2

| Exit Pupil Positions | Incident Angles | Angles Between Principal Plane and Optical Axis (90°-β) |
|---|---|---|
| 6 mm | 35° | 35.2° + 1° |
| 10 mm | 20° | + 2.5° |
| 15 mm | 14° | + 5° |
| 20 mm | 11° | + 7.5° |
| 50 mm | 4° | + 10° |

As shown in Table 2, as the incident angle is increased (in other words, as the exit pupil position approaches the image forming surface), the allowance for the angles of the optical axis about an angle of 35.2° is narrowed. For this reason, the angle must be made to be closest to the angle of 35.2°. Also, when the optical axis forms an angle of 45° as in the prior art systems, the actual use of the crystal OLPF is limited to a range in which the incident angles are equal to or less than 4°.

As described above, in Table 2, the allowance of the cut-off frequencies is set for the range of ±5%. However, when the tolerance is set for a range smaller than ±5%, then the allowable range of the optical axis angles is narrower than that shown in Table 2.

Figure 1:
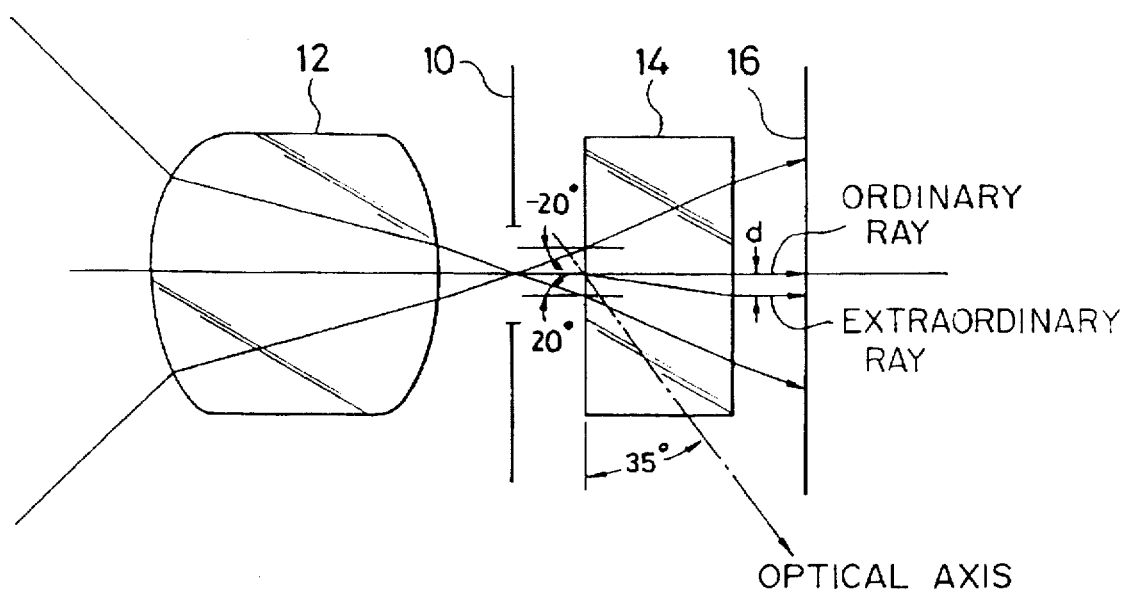
FIG. 1 is a plan view of a photographing optical system of a photographing device to which an optical filter according to the invention is applied.

Referring now to FIG. 1, there is shown a plan view of a photographing optical system of a photographing device to which an optical filter according to the invention is applied. In FIG. 1, reference numeral 10 designates a diaphragm, 12 a taking lens, 14 an optical filter (OLPF), and 16 an image forming surface of a CCD image pickup device.

The OLPF 14 is an artificial crystal which is arranged such that an angle between an incident plane of an incident light ray entering through the taking lens 12 and an optical axis is 35°. The OLPF 14 has an ordinary index of refraction of 1.54425 and an extraordinary index of refraction of 1.55336. The OLPF 14 divides a spot image, which enters the OLPF 14, into an ordinary ray and an extraordinary ray and then guides them to the image forming surface 16.

Here, the separation width d between the above-mentioned an ordinary ray and an extraordinary ray is determined by a cutoff frequency, that is, a half of the number of pixels in the CCD image pickup device and, in the present embodiment, the separation width d is $1.290 \times 10^{-2}$ mm when an angle of incidence is 0°. And, the cutoff frequency is 38.75 line/mm.

Figure 2:
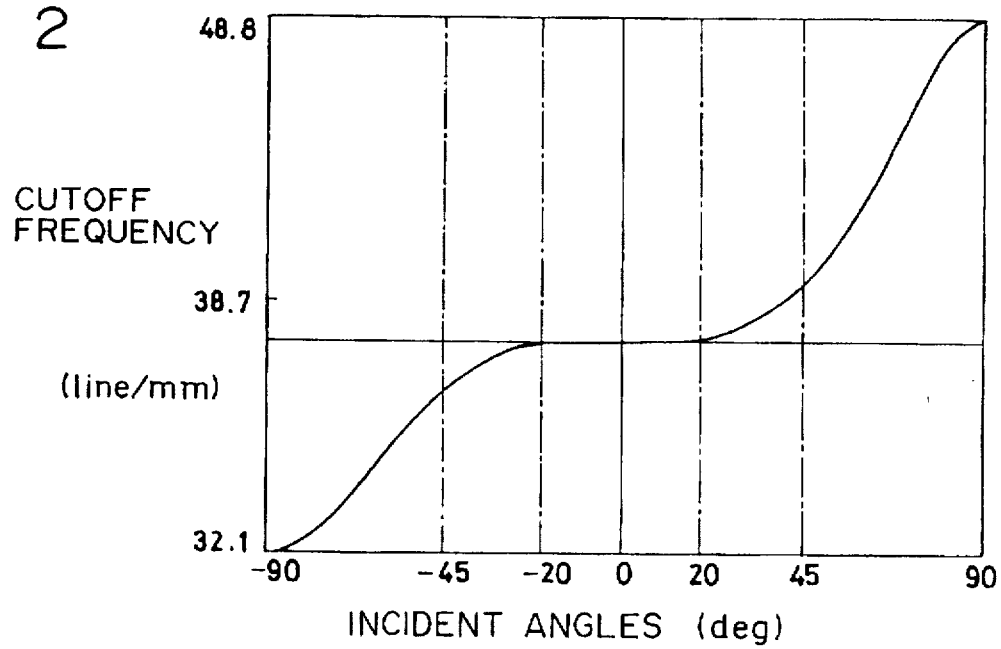
FIGS. 2 and 3 are graphical representations of cutoff frequencies with respect to the angles of incidence respectively in an optical filter according to the invention and in an optical filter according to the prior art.

Now, the cutoff frequency of the above-mentioned OLPF 14 with respect to the angles of incidence can be shown as in FIG. 2. As shown in FIG. 2, the cutoff frequency thereof is constant in the neighborhood of 38.7 line/mm where the angles of incidence are in the range of ±20°, so that a desired characteristic as an OLPF can be maintained.

Figure 3:
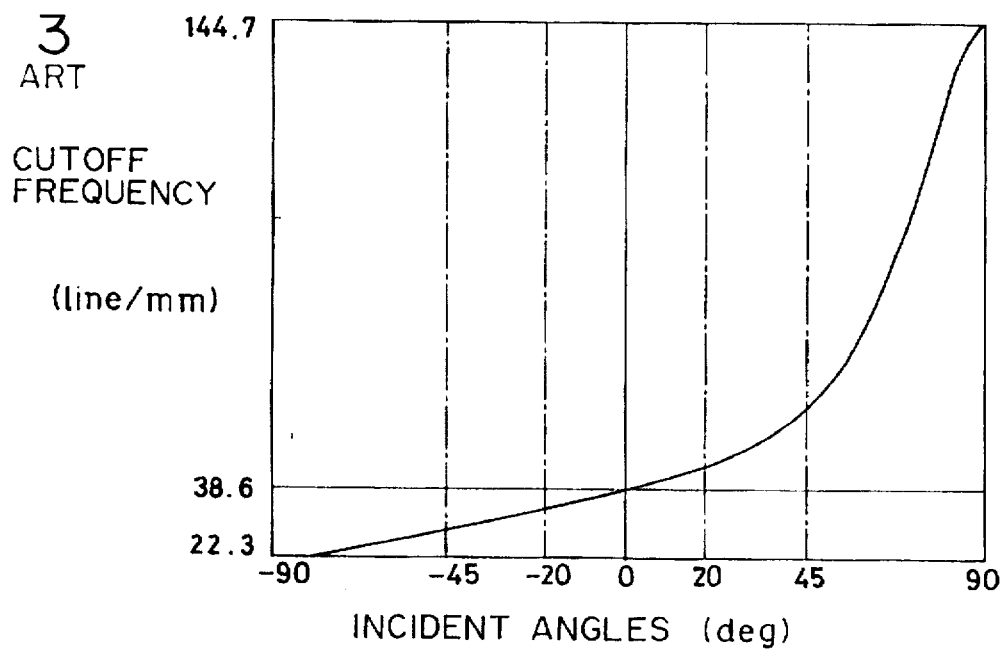

On the other hand, referring to the cutoff frequency of a prior art OLPF with respect to the angles of incidence in which an angle between an incident plane of an incident light and an optical axis, there is obtained FIG. 3. As shown in FIG. 3, in the prior art OLPF, when the angles of incidence are in the neighborhood of ±20°, the cutoff frequency thereof is shifted greatly from a desired cutoff frequency 38.64 (line/mm).

Now, differences in characteristics between the present invention in which the angle of the incidence plane with respect to the optical axis is 35° and the prior art in which the angle is 45° are shown in Table 3.

TABLE 3

|  | Optical Axis of 35° | Prior Art Optical Axis of 45° |
| --- | --- | --- |
| Incident Angle | Cutoff Frequency (line/mm) | Cutoff Frequency (line/mm) |
| −20° | 38.67 (−0.2%) | 34.49 (−10.7%) |
| 0° | 38.75 | 38.64 |
| +20° | 38.82 (+0.2%) | 43.92 (+13.7%) |
| Thickness | 2.33 mm (+6%) | 2.2 mm |

As shown in Table 3, in the case of the optical axis of 35°, the cutoff frequency for an incident angle of ±20° provides a range of error of ±0.2% with respect to the cutoff frequency for an incident angle of 0°, while in the case of the optical axis of 45°, the cutoff frequency for the incident angle of ±20° produces an error of ±10% or more with respect to the cutoff frequency for the incident angle of 0°.

Also, when the optical axis is 35°, it is true that the OLPF is increased in thickness when compared with the OLPF having the optical axis of 45°, but even in this case the increase in thickness is only 0.13 mm, that is, the thickness increase provides only 6% at most over the conventional thickness. Here, although the optical axis is 35° in the present embodiment, this is not limitative, but any of angles smaller than an angle of 45° can be selected according to cases.

Figure 4:
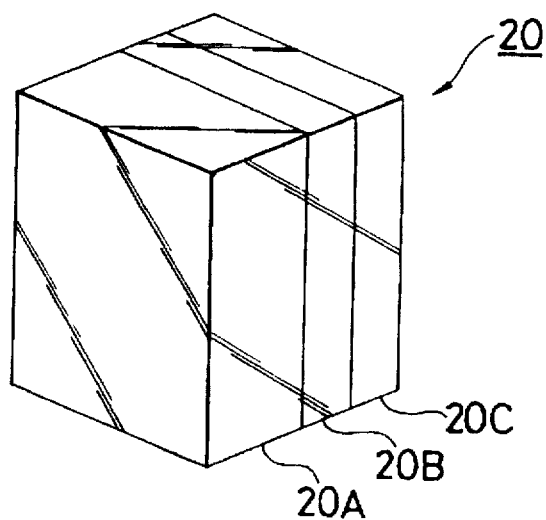
FIG. 4 is a perspective view of the another embodiment of an optical filter according to the invention.

Referring now to FIG. 4, there is shown a perspective view of another embodiment of an optical filter according to the invention, in which an OLPF 20 is formed of three crystals 20A, 20B and 20C bonded to one another.

In this embodiment, the crystal 20A is used to cut off a spacial frequency f and, as in the before-mentioned OLPF 14, it is arranged such that an optical axis is smaller than an angle of 45°, with the thickness thereof greater than that of the OLPF having an optical axis of 45°. On the other hand, the crystals 20B and 20C are used to cut off frequencies which are approximately two times the spacial frequency fc.

Figure 5A:
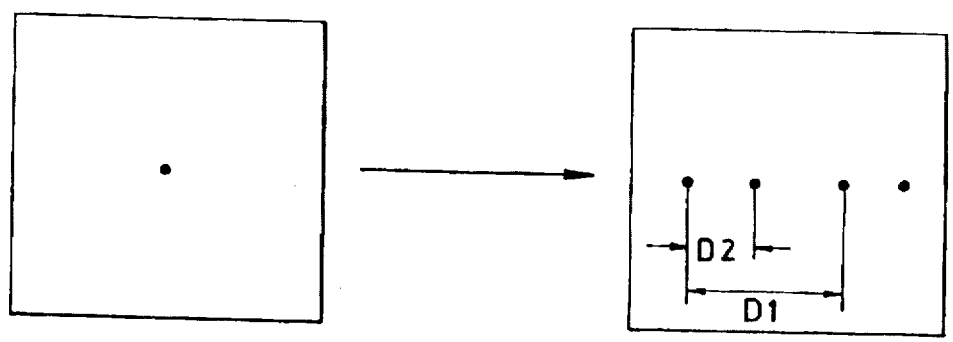
FIG. 5 (A) is a view to show the separation between spot images entering the optical filter shown in FIG. 4.

A spot image entering the OLPF 20, as shown in FIG. 5(A), is divided into four points by the three crystals 20A, 20B and 20C. In this figure, D1 designates a width of division or separation by the crystal 20A, and D2 represents a horizontal separation width of ray combined by the two crystals 20B and 20C. D2 is slightly smaller than a half of D1.

Figure 5B:
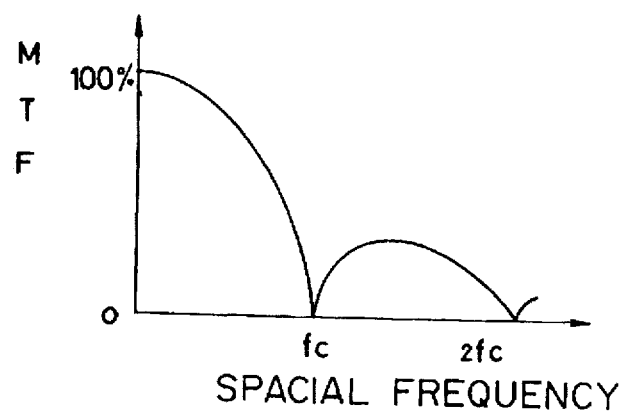

In other words, although the crystal 20A is increased in thickness over the OLPF having an optical axis of 45°, the two crystals 20B and 20C are arranged such that the thicknesses thereof are decreased to a degree corresponding to the increase of the thickness of the crystal 20A. Therefore, the crystals 20B and 20C cut off frequencies higher than the spacial frequency 2 fc, as shown in FIG. 5(B). However, due to the fact that a modulation transfer function (MTF) is lowered as the spacial frequency is increased, as described above, even if the cut off frequencies vary slightly, such variation has no great effects on the characteristic of the OLPF 20.

As has been described heretofore, with an optical filter according to the invention, the optical filter provides a good characteristic even when the incident angle of ray is great and also prevents generation of a false signal on the whole screen.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An optical filter adapted for use with an image receiving lens and an image pickup device, comprising:

a birefringent material interposed between said image receiving lens and said image pickup device for receiving incident light rays of an object and for removing a component corresponding to a frequency multiplexed in a special frequency manner from a high frequency component contained in an image of said object, and means for providing a substantially constant cutoff frequency of said filter within a predetermined range of angles of incidence of said incident light rays, said means comprising said optical filter being formed such that an angle between an optical axis of said optical filter and an incident plane is smaller than an angle of 45°.

2. An optical filter as set forth in claim 1, wherein the angle between the optical axis of said optical filter and the incident plane is about 35°.

3. An optical filter adapted for use with an image receiving lens and an image pickup device, comprising:

a birefringent material interposed between said image receiving lens and said image pickup device for receiving incident light rays of an object and for removing a component corresponding to a frequency multiplexed in a spacial frequency manner from a high frequency component contained in an image of said object, said optical filter being formed such that an angle between an optical axis of said optical filter and an incident plane of said optical filter is smaller than an angle of 45° to provide a substantially constant cutoff frequency of said filter within a predetermined range of angles of incidence of said incident light rays received by said birefringent material, and wherein said angle between said optical axis of said optical filter and said incident plane is an angle within a range of angles of 35.2°±7.5° when the greatest incident angle is 11° with respect to said incident plane, said angle approaching an angle of 35.2° as said greatest incident angle is increased, and said angle being an angle within a range of angles of 35.2°±1° when said greatest incident angle is 35°.

4. An optical filter adapted for use with an image receiving lens and an image pickup device, comprising:

a birefringent material interposed between said image receiving lens and an image pickup device for receiving incident light rays of an object and for removing a component corresponding to a frequency multiplexed in a spacial frequency manner from a high frequency component contained in an image of said object;

a first optical filter member for removing a component corresponding to a first frequency; and a second optical filter member for removing a component corresponding to a frequency two times that of the first frequency, the first and second optical filters being bonded together, wherein an angle between an optical axis of said first optical filter member and an incident plane is set smaller than an angle of 45° to provide a substantially constant cutoff frequency of said filter within a predetermined range of angles of incidence of said incident light rays, whereby a thickness of said second optical member is decreased to an extent corresponding to an increase in the thickness of said first optical filter member.

5. An image pickup system, comprising:

an image receiving lens;

an image pickup device for photo-electrically transducing an image of an object which is received by and is focused through said image receiving lens; and an optical filter including a birefringent material interposed between said image receiving lens and said image pickup device for removing a component corresponding to a frequency multiplexed in a spacial frequency manner from a high frequency component contained in the image of said object, wherein an angle between an optical axis of said optical filter and an incident plane of said optical filter is smaller than 45°.

6. The image pickup system as set forth in claim 5, wherein said optical filter is formed such that an angle formed by said optical axis of said optical filter and said incident plane of said optical filter is approximately 35°.

* * * * *